(12) United States Patent
    Saitou

(10) Patent No.: US 11,048,215 B2
(45) Date of Patent: Jun. 29, 2021

(54) TOOL SELECTING APPARATUS AND MACHINE LEARNING DEVICE

(71) Applicant: FANUC Corporation, Yamanashi (JP)

(72) Inventor: Takuya Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 78 days.

(21) Appl. No.: 16/383,662

(22) Filed: Apr. 15, 2019

(65) Prior Publication Data

US 2019/0332069 A1    Oct. 31, 2019

(30) Foreign Application Priority Data

Apr. 26, 2018   (JP) .............................. JP2018-085768

(51) Int. Cl.
    *G05B 13/02*      (2006.01)
    *G05B 19/4093*    (2006.01)
    *B23Q 15/22*      (2006.01)
    *G06N 20/00*      (2019.01)

(52) U.S. Cl.
    CPC ......... *G05B 13/0265* (2013.01); *B23Q 15/22* (2013.01); *G05B 19/40935* (2013.01); *G05B 19/40937* (2013.01); *G06N 20/00* (2019.01); *G05B 2219/31407* (2013.01); *G05B 2219/31418* (2013.01)

(58) Field of Classification Search
    CPC .......... G05B 13/0265; G05B 19/40937; G05B 19/40935; G05B 2219/31418; G05B 2219/31407; G06N 20/00; G06F 9/3891; B23Q 15/22
    See application file for complete search history.

(56) References Cited

U.S. PATENT DOCUMENTS

| 5,801,963 | A | * | 9/1998 | Sadler ............... G05B 19/40938 702/34 |
| 6,107,768 | A | * | 8/2000 | Ouchi .............. G05B 19/40937 318/568.1 |
| 6,401,004 | B1 | * | 6/2002 | Yamazaki ........ G05B 19/40937 700/159 |
| 10,082,771 | B2 | | 9/2018 | Nakazawa |
| 2016/0171731 | A1 | * | 6/2016 | Kandogan ............... G06T 11/60 345/629 |
| 2019/0134767 | A1 | * | 5/2019 | Nishikawa ............. B23Q 17/12 |

FOREIGN PATENT DOCUMENTS

| JP | S6445545 A | 2/1989 |
| JP | H3294147 A | 12/1991 |
| JP | 2017-64837 A | 4/2017 |

* cited by examiner

*Primary Examiner* — Mohammad Ali
*Assistant Examiner* — Vincent W Chang
(74) *Attorney, Agent, or Firm* — Hauptman Ham, LLP

(57) ABSTRACT

A machine learning device included in a tool selecting apparatus includes a state observing unit that observes, as state variables indicative of a current environmental state, data related to machining condition, data related to cutting condition, data related to machining result, and data related to a tool, and a learning unit that, by using the state variables, learns distribution of the data related to the machining condition, the data related to the cutting condition, and the data related to the machining result, with respect to data related to the tool.

3 Claims, 4 Drawing Sheets

TOOL SELECTING APPARATUS AND MACHINE LEARNING DEVICE

RELATED APPLICATIONS

The present application claims priority to Japanese Patent Application Number 2018-085768 filed Apr. 26, 2018, the disclosure of which is hereby incorporated by reference herein in its entirety.

BACKGROUND OF THE INVENTION

Field of the Invention

The present invention relates to a tool selecting apparatus that selects an appropriate tool and determines an appropriate cutting condition, and to a machine learning device.

Description of the Related Art

To machine a workpiece by means of a machine tool, a tool for use in machining needs to be selected, and a cutting condition for machining using the selected tool needs to be determined. In selection of a tool and determination of a cutting condition, during the planning time of machining, a tool to be used and a cutting condition (spindle rotation speed, feed) are provisionally determined by use of a tool catalog booklet or a tool selector prepared by a tool manufacturer, and adjustment of a cutting condition is performed through repetitions of trial machining using the provisionally determined tool under the provisionally determined cutting condition. Thus, a tool and a cutting condition are determined when it is confirmed that no problem has occurred.

As a conventional technique for determining a cutting condition for use in machining using a machine tool, Japanese Patent Application Laid-Open No. 2017-064837 discloses a technique for determining a cutting condition on the basis of the conditions of a tool load allowable during machining.

A cutting condition greatly depends on machine properties such as spindle output and stiffness, or on a machining condition such as the material quality of a workpiece or a machining type. However, information provided by a tool catalog booklet or a tool selector is for general purpose, and thus, trial machining and verification of the machining results need to be repeated many times in order to derive a condition that matches a machine to be used for machining or a machining condition. This requires time and labor. In addition, when the cutting condition is adjusted, a machining program or tool data also needs to be corrected accordingly. This operation also requires time. Furthermore, the cutting condition needs to be further adjusted according to whether operation in which preference is given to a cycle time is to be performed, or operation in which preference is given to machining accuracy or tool life is to be performed.

Meanwhile, the technique disclosed in Japanese Patent Application Laid-Open No. 2017-064837 enables determination of a cutting condition. However, the cutting condition can be used during machining using a specific tool, therefore, the technique is not useful for selecting a further appropriate tool according to the purpose of machining.

SUMMARY OF THE INVENTION

Therefore, an object of the present invention is to provide a tool selecting apparatus and a machine learning device capable of selecting an appropriate tool and determining an appropriate cutting condition.

A tool selecting apparatus according to the present invention implements a mechanism of deriving an appropriate tool and an appropriate cutting condition (a rotation speed, a feed rate) for a peak value of a spindle load satisfying a machining condition (the material quality of a workpiece, a machining type, the depth of cutting, the width of cutting) and requested operation specifications (speed, accuracy, tool lifetime), by use of machine learning. A machining program and tool data are automatically rewritten so as to adapt to the tool and the cutting condition derived by the mechanism.

A worker uses the aforementioned mechanism at a time point when inputting a machining program and workpiece information during a setup process, and thereby comes to be able to select a tool and set a cutting condition according to machining, without performing any trial operation or performing an operation of changing the machining program and tool data.

A tool selecting apparatus according to one aspect of the present invention selects a tool type that is usable in machining of a workpiece under a designated condition and includes a machine learning device that learns, for a designated condition, a tool type that is usable in machining of a workpiece. The machine learning device includes: a state observing unit that observes, as state variables indicative of a current environmental state, data related to machining condition, data related to cutting condition, data related to machining result, and data related to a tool; and a learning unit that, by using the state variables, learns distribution of the data related to the machining condition, the data related to the cutting condition, and the data related to the machining result, with respect to the data related to the tool.

A tool selecting apparatus according to another aspect of the present invention selects a tool type that is usable in machining of a workpiece under a designated condition, and includes a machine learning device that has learned, for a designated condition, a tool type that can be used for machining of a workpiece. The machine learning device includes: a state observing unit that observes, as state variables indicative of a current environmental state, data related to machining condition, data related to cutting condition, data related to machining result; a learning unit that has learned distribution of the data related to the machining condition, the data related to the cutting condition, and the data related to the machining result, with respect to data related to a tool used in machining; and a determination unit that determines a tool type that is usable under a condition designated by the state variables, based on the state variables observed by the state observing unit and a learning result by the learning unit, and outputs the determined tool type.

The determination unit may determine the cutting condition that can be designated along with the tool type determined to be usable, and outputs the cutting condition.

A machine learning device according to one aspect of the present invention learns, for a designated condition, a tool type that is usable in machining of a workpiece, and includes: a state observing unit that observes, as state variables indicative of a current environmental state, data related to machining condition, data related to cutting condition, data related to machining result, and data related to a tool; and a learning unit that, by using the state variables, learns distribution of the data related to the machining condition, the data related to the cutting condition, and the data related to the machining result, with respect to the data related to the tool.

A machine learning device according to another aspect of the present invention is a machine learning device that has learned, for a designated condition, a tool type that is usable in machining of a workpiece, and includes: a state observing unit that observes, as state variables indicative of a current environmental state, data related to machining condition, data related to cutting condition, and data related to machining result; a learning unit that has learned distribution of the data related to the machining condition, the data related to the cutting condition, and the data related to the machining result, with respect to data related to a tool used in machining; and a determination unit that determines a tool type that is usable under a condition designated by the state variables, based on the state variables observed by the state observing unit and a learning result by the learning unit, and outputs the determined tool type.

According to the present invention, selection of a tool, derivation of a cutting condition, and the application thereof can be easily performed so as to match application purposes at a site such as mechanical characteristics, a machining condition, important points (speed, accuracy, tool lifetime) during operation, whereby the time required for a setup process is shortened.

DETAILED DESCRIPTION OF THE REFERRED EMBODIMENTS

Figure 1:
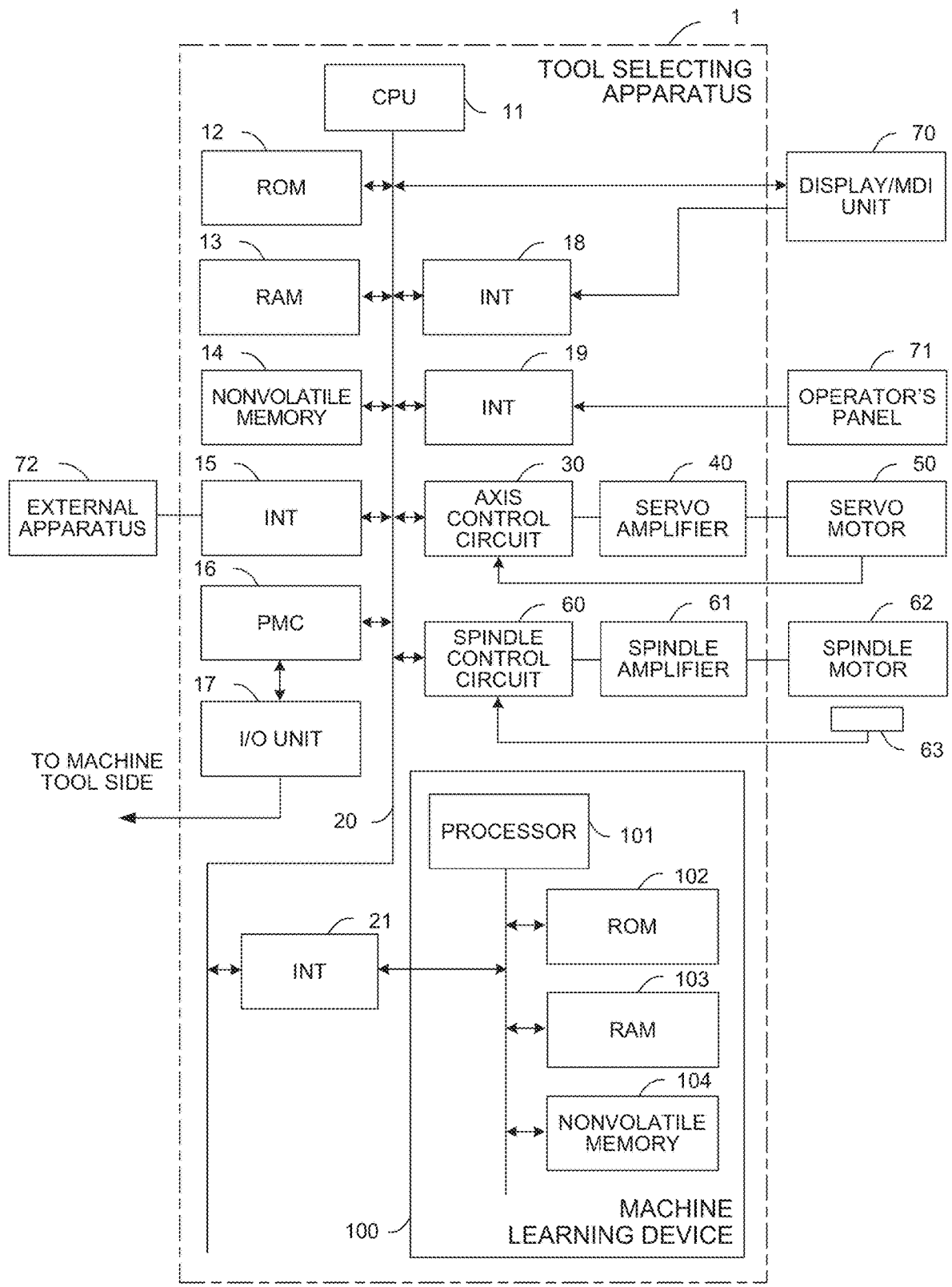
FIG. 1 is a schematic hardware configuration diagram of a tool selecting apparatus according to a first embodiment.

FIG. 1 is a schematic hardware configuration diagram illustrating the main components of a tool selecting apparatus according to one embodiment of the present invention.

A tool selecting apparatus 1 may be implemented as a controller for controlling a machine such as a machine tool, may be implemented as a personal computer provided along with a controller for controlling a machine, or may be implemented as a computer such as a cell computer, a host computer, or a cloud server connected to a controller over a network. FIG. 1 illustrates an example in which the tool selecting apparatus 1 is implemented as a controller for controlling a machine tool.

A CPU 11 included in the tool selecting apparatus 1 according to the present embodiment is a processor that controls the entirety of the tool selecting apparatus 1, reads out a system program stored in a ROM 12 via a bus 20, and controls the entirety of the tool selecting apparatus 1 in accordance with the system program. Temporal calculation data and display data, various data input by an operator through an input unit (not illustrated), and the like, are temporarily stored in a RAM 13.

A nonvolatile memory 14 is configured as a memory of which the storage state is held even after the tool selecting apparatus 1 is turned off, since backup is performed by means of a battery (not illustrated), for example. A machining program read from an external apparatus 72 via an interface 15, a machining program input via a display/MDI unit 70, and various data acquired from the components of the tool selecting apparatus 1 or the machine tool (for example, a machining condition (the material quality of a workpiece, a machining type, the depth of cutting, the amount of cutting) input by a worker, tool information, a cutting condition (the spindle rotation speed, the feed rate), a spindle load during machining under the cutting condition, etc.) are stored in the nonvolatile memory 14. The machining programs and various data stored in the nonvolatile memory 14 may be developed in the RAM 13 when being executed or used. Further, various system programs (including a system program for controlling communication with a machine learning device 100 (described later)) such as publicly known analysis programs, etc., are preliminarily written in the ROM 12.

The interface 15 connects the tool selecting apparatus 1 to the external apparatus 72 such as an adaptor. Programs, various parameters, and the like are read from the external apparatus 72 side. In addition, programs and various parameters, etc. edited at the tool selecting apparatus 1 can be stored in external storage means via the external apparatus 72. On the basis of a sequence program incorporated in the tool selecting apparatus 1, a programmable machine controller (PMC) 16 outputs signals to a machine tool and a peripheral device thereof (e.g., an actuator such as a robot hand for tool exchange) via an I/O unit 17, and controls the machine tool and the peripheral device. Further, the PMC 16 receives signals from various switches, etc., on an operator's panel provided to the main body of the machine tool, performs necessary signal processing on the signals, and passes the processed signals to the CPU 11.

The display/MDI unit 70 is a manual data input device provided with a display and a keyboard, etc. An interface 18 receives an instruction and data from the keyboard of the display/MDI unit 70, and passes the instruction and the data to the CPU 11. An interface 19 is connected to an operator's panel 71 provided with a manual pulse generator that is used for manual driving of axes, or the like.

An axis control circuit 30 for controlling axes included in the machine tool, receives an instructed amount of axis movement from the CPU 11, and outputs an instruction for the axis to a servo amplifier 40. The servo amplifier 40 receives the instruction, and drives a servo motor 50 that moves the axis included in the machine tool. The servo motor 50 for the axis has a built-in position/speed detector, feeds back a position/speed feedback signal from the position/speed detector to the axis control circuit 30, and performs position/speed feedback control. Note that, in the hardware configuration diagram in FIG. 1, one axis control circuit 30, one servo amplifier 40, and one servo motor 50 are illustrated. However, in practice, the axis control circuits 30, the servo amplifiers 40, and the servo motors 50 are prepared as many as the axes included in a machine tool to be controlled.

A spindle control circuit 60 receives a spindle rotating instruction for a machine tool, and outputs a spindle speed signal to a spindle amplifier 61. The spindle amplifier 61 receives the spindle speed signal, rotates a spindle motor 62 of the machine tool at the instructed rotation speed, and drives a tool. A position coder 63 is coupled with the spindle motor 62. The position coder 63 outputs a feedback pulse in synchronization with the rotation of the spindle. The feedback pulse is read by the CPU 11.

An interface 21 connects the tool selecting apparatus 1 to the machine learning device 100. The machine learning device 100 includes a processor 101 that controls the entirety of the machine learning device 100, a ROM 102 in which a system program and the like are stored, a RAM 103 for performing temporal storage during processes related to machine learning, and a nonvolatile memory 104 that is used for storing a learning model and the like. The machine learning device 100 can observe various information that can be acquired by the tool selecting apparatus 1 via the interface 21 (for example, a machining condition (the material quality of a workpiece, a machining type, the depth of cutting, the amount of cutting, etc.) input by the worker, tool information, a cutting condition (spindle rotation speed, feed rate), and the operating state (the spindle load, etc., during machining)). In addition, the tool selecting apparatus 1 displays, on the display/MDI unit 70, tool selection and a proposal of a cutting condition outputted from the machine learning device 100, and selects a tool and sets a cutting condition (corrects a machining program, or sets tool data, for example), based on the selection made by the worker who has checked the display.

Figure 2:
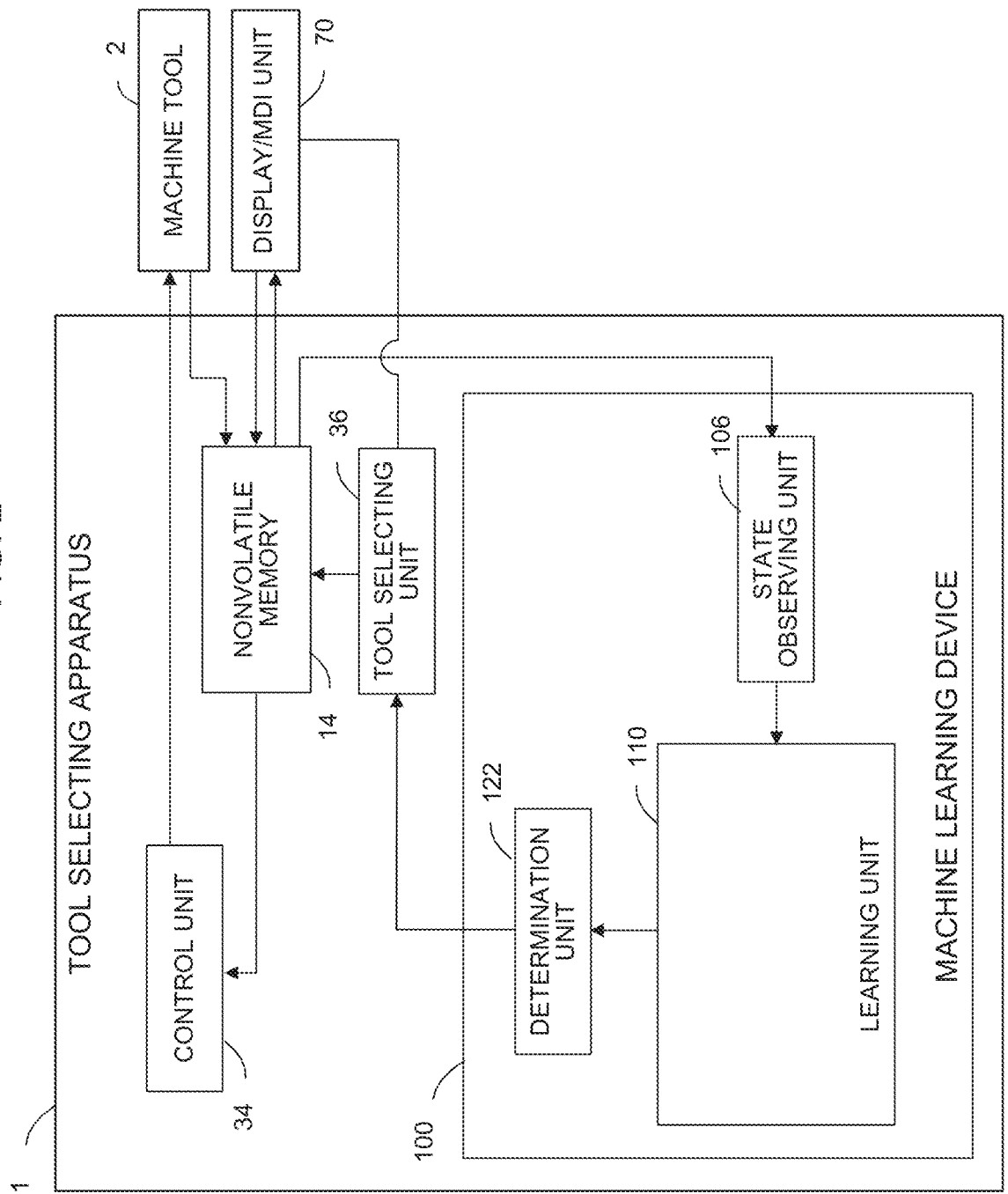
FIG. 2 is a schematic functional block diagram of the tool selecting apparatus according to the first embodiment.

FIG. 2 is a schematic functional block diagram of the tool selecting apparatus 1 and the machine learning device 100 according to the first embodiment.

The functional blocks illustrated in FIG. 2 are implemented by the CPU 11 included in the tool selecting apparatus 1 and the processor 101 of the machine learning device 100 illustrated in FIG. 1 executing system programs to control the operations of the components of the tool selecting apparatus 1 and the machine learning device 100, respectively.

The tool selecting apparatus 1 of the present embodiment includes a control unit 34 that controls motors such as the servo motor 50 and the spindle motor 62 included in the machine tool 2 and controls a peripheral machine (not illustrated) of the machine tool 2, based on the machining program or machining conditions stored in the nonvolatile memory 14, setting of the cutting condition, or the like, and a tool selecting unit 36 that displays, on the display/MDI unit 70, a tool type determined to be usable in machining by the machine learning device 100, or other conditions such that the tool type selected by the worker or the other conditions are set as information for use in machining.

Meanwhile, the machine learning device 100 included in the tool selecting apparatus 1 includes software (a learning algorithm, etc.) and hardware (the processor 101, etc.) for performing self-learning of data related to a tools with respect to data related to machining condition (the material quality of a workpiece, a machining type, the depth of cutting, the amount of cutting, etc.), data related to machining result (spindle load during machining, and the like), and data related to cutting condition (spindle rotation speed, feed rate), and for performing self-learning of determination of data related to a tools with respect to data related to input machining condition (the material quality of a workpiece, a machining type, the depth of cutting, the amount of cutting, etc.), data related to cutting condition (spindle rotation speed, feed rate), and data related to machining result (spindle load, machining accuracy, etc., during machining), through so-called machine learning. What is learned by the machine learning device 100 included in the tool selecting apparatus 1 corresponds to a model structure indicative of the correlation of data related to a tools with respect to date related to the machining condition (the material quality of a workpiece, a machining type, the depth of cutting, the amount of cutting, etc.), data related to the cutting condition (spindle rotation speed, feed rate), and data related to the machining result (the spindle load, the machining accuracy, etc., during machining).

As illustrated in the functional blocks in FIG. 2, the machine learning device 100 included in the tool selecting apparatus 1 includes a state observing unit 106, a learning unit 110, and a determination unit 122. The state observing unit 106 observes state variables S that include machining condition data S1 including data related to the machining condition (the material quality of a workpiece, a machining type, the depth of cutting, the amount of cutting, etc.), cutting condition data S2 including data related to the cutting condition (spindle rotation speed, feed rate), machining result data S3 including date related to the machining data (spindle load, machining accuracy, etc., during machining), and tool data S4 including data related to the tool. The learning unit 110 learns, by using the state variables S, data related to the tool in association with data related to the machining condition (the material quality of a workpiece, a machining type, the depth of cutting, the amount of cutting, etc.), data related to the cutting condition (spindle rotation speed, feed rate), and data related to the machining result (the spindle load during machining, etc.). And the determination unit 122 determines, by using a learned model learned by the learning unit 110, data related to the tool with respect to data related to the machining condition (the material quality of a workpiece, a machining type, the depth of cutting, the amount of cutting, etc.), data related to the cutting condition (spindle rotation speed, feed rate), and data related to the machining result (spindle load, machining accuracy, etc., during machining).

Among the state variables S which are observed by the state observing unit 106, the machining condition data S1 can be acquired as a machining condition that is set by a worker during machining using the machine tool 2. The machining condition may include the material quality of a workpiece to be machined, a machining type such as rigid type machining or end mill machining, and the amount of cutting or the depth of cutting of the workpiece by means of a tool, for example. The state observing unit 106 observes, as the machining condition data S1, a machining condition input into the machine tool 2 or the controller, or a machining condition set in the machining program.

Among the state variables S which are observed by the state observing unit 106, the cutting condition data S2 can be acquired as a cutting condition that is set by a worker during machining using the machine tool 2. The cutting condition may include the spindle rotation speed, the feed rate, and the like, for example. The state observing unit 106 observes, as the cutting condition data S3, the cutting condition input into the machine tool 2 or the controller, and the cutting condition set in the machining program.

Among the state variables S which are observed by the state observing unit 106, the machining result data S3 can be acquired as the maximum value of the feed axis load, the spindle load, or the like detected by the machine tool 2 (or a sensor, etc., attached to the machine tool 2) during machining a workpiece using a tool (observed as the tool data S4) attached to the machine tool 2, under the set machining condition (observed as the machining condition data S1) and the cutting condition (observed as the cutting condition data S2), or can be acquired as the machining error indicating dimension error of the machined workpiece from a designed value, or the like. A value obtained by detecting a physical quantity that has caused a machining defect, a failure of the machine tool 2, a breakage of the tool, or the like, during the performed machining, or data for evaluating the result of machining, or a value input by the worker, etc., can be used for the machining result data S3.

Among the state variables S which are observed by the state observing unit 106, the tool data S4 can be acquired as information related to a tool for use in machining using the machine tool 2. The information related to the tool may include information (e.g., the model number of the tool) which can uniquely specify a tool type, for example, and may include the manufacturer of the tool, the material quality (hardness) of the tool, etc., if needed. Data input by the worker, data included in a machining instruction set by a high-order device such as a cell computer can be mainly used for the information related to the tool.

The learning unit 110 performs cluster analysis based on the state variables S (the machining condition data S1, the cutting condition data S2, the machining result data S3, the tool data S4) in accordance with an arbitrary learning algorithm which is generally called machine learning, and stores (learns), as a learned model, a cluster created as the result of the cluster analysis. The learning unit 110 creates a cluster on the basis of a predetermined number of the state variables S (the machining condition data S1, the cutting condition data S2, the machining result data S3, the tool data S4) acquired when machining of a workpiece was normally performed. Accumulated data (big data) acquired from the machine tool 2 placed in a factory, for example, over a wired/wireless network, may be used for the state variables S to be used for creating a cluster. As a result of such learning, the learning unit 110 analyzes, as a cluster set, tool type (tool data S4)-based distribution of the machining condition (the machining condition data S1), the cutting condition (the cutting condition data S2), and the operating state (the machining result data S3) of the machine tool 2.

Figure 3:
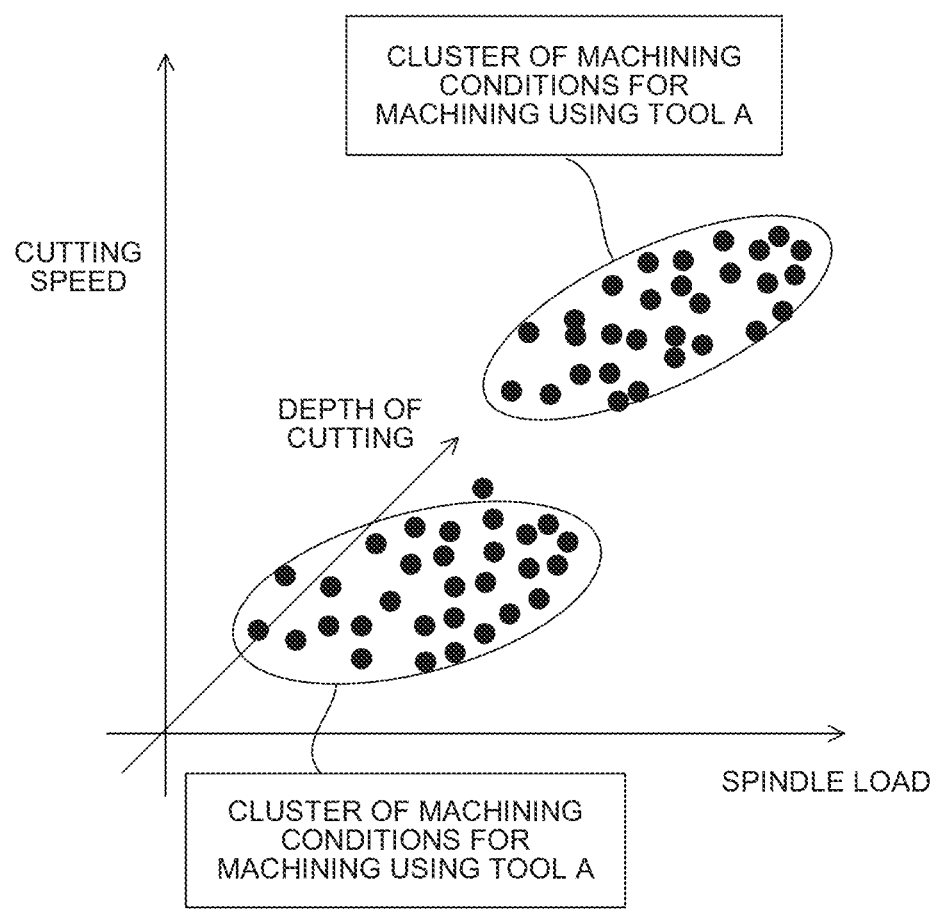
FIG. 3 is an explanatory diagram showing cluster analysis to be performed by a learning unit.

FIG. 3 is a diagram showing an example of cluster sets created by the learning unit 110. Note that, in FIG. 3, in order to make the explanation simple, the space for data distribution is three-dimensional, and the axes respectively indicate the depth of cutting (the machining condition data S1), the cutting speed (the cutting condition data S2), and the spindle load (machining result data S3). However, in practice, data distribution is given in a multi-dimensional space having axes indicating respective data items (excluding the tool type (tool data S4)) acquired as the state variables S.

As shown in FIG. 3, the learning unit 110 creates different clusters at least for respective tool types. As shown in FIG. 3, clusters created by the learning unit 110 each indicate the tool type-based trend of distribution of the operating state corresponding to the machining condition and the cutting condition. That is, the clusters each indicate the trend of the operating state (spindle load) obtained when machining is performed with use of a predetermined tool under the set machining condition (the depth of cutting) and the set cutting condition (the cutting speed). The clusters are used when the determination unit 122 makes determination to select a tool with constraints of the machining condition, the cutting condition, and the operating state, for example.

The determination unit 122 determines which tool is appropriate for use, on the basis of the learned model (a cluster of the machining condition (the machining condition data S1), the cutting condition (the cutting condition data S2), and the operating state of the machine tool 2 (the machining result data S3) for each of tool types (the tool data S4)) obtained by performing learning based on the state variables S (the machining condition data S1, the cutting condition data S2, the machining result data S3, the tool data S4) acquired by the learning unit 110 when machining of a workpiece was normally performed, and on the basis of newly observed (input) machining condition data S1, cutting condition data S2, and machining result data S3.

Operation of the determination unit 122 will be described with use of FIG. 3 as an example. In a state where a cluster obtained by normal machining of a workpiece has been created, when new machining condition data S1, new cutting condition data S2, and new machining result data S3 are observed (input), the determination unit 122 analyzes the relationship between these data and a cluster for each tool type, and determines, as a tool type that is usable under the designated condition, a tool type corresponding to the cluster to which the input new state variables S belong. Note that the state variables S input in this case, may be set within a predetermined range. For example, in a case where the spindle load condition that the spindle load is equal to or lower than L1 is input as the machining result data S3, tool types corresponding to all the clusters overlapping this range may be determined as tool types that are usable under the designated condition.

The determination unit 122 not only may simply determine a tool type, but also may determine the priorities to tool types for use under the designated condition, on the basis of the distances, in the cluster space, of the positions of newly observed (input) machining condition data S1, cutting condition data S2, and machining result data S3 from the centers of respective clusters, or on the basis of the cluster densities, of respective clusters, at the positions of newly observed (input) machining condition data S1, cutting condition data S2, and machining result data S3.

Furthermore, after determining a new usable tool type with respect to the observed (input) machining condition data S1, the cutting condition data S2, and the machining result data S3, the determination unit 122 may determine the range of a machining condition or cutting condition that can be set when machining using a tool of the determined tool type is performed. For example, after determining a usable tool type, the determination unit 122 may determine the maximum value of the cutting speed within such a range that can hold the designated machining result (spindle load, etc.) in the cluster for the tool type.

As described above, in a case where a tool type that enables normal machining for achieving the desired machining result under the designated machining condition and cutting condition can be automatically determined without involving calculation or estimation, a worker can quickly make a determination to select an appropriate tool only by inputting (or reading, from a CAD/CAM, etc.) a required machining condition, a required cutting condition, and a desired machining result.

Then, tool types (and the priorities given to the tool types, the range of the machining condition or the cutting condition) determined by the determination unit 122 are output to the tool selecting unit 36. The tool selecting unit 36 displays, on the display/MDI unit 70, one or more tool types that are usable under the designated conditions. The worker selects, as a tool to be used in machining, a tool type by operating the display/MDI unit 70, and sets the selected tool type in the machining program, etc. stored in the nonvolatile memory 14. In the case where the determination unit 122 has determined the ranges of the machining condition or cutting condition that can be set for machining using respective tool types, the tool selecting unit 36 additionally displays the ranges of the machining condition or cutting condition, so as to urge the worker to input whether or not to change the designated machining condition or cutting condition. Through the tool selecting unit 36, the machining condition or cutting condition designated by the worker is set in the machining program stored in the nonvolatile memory 14, or a set region provided in the nonvolatile memory 14, or the like.

Figure 4:
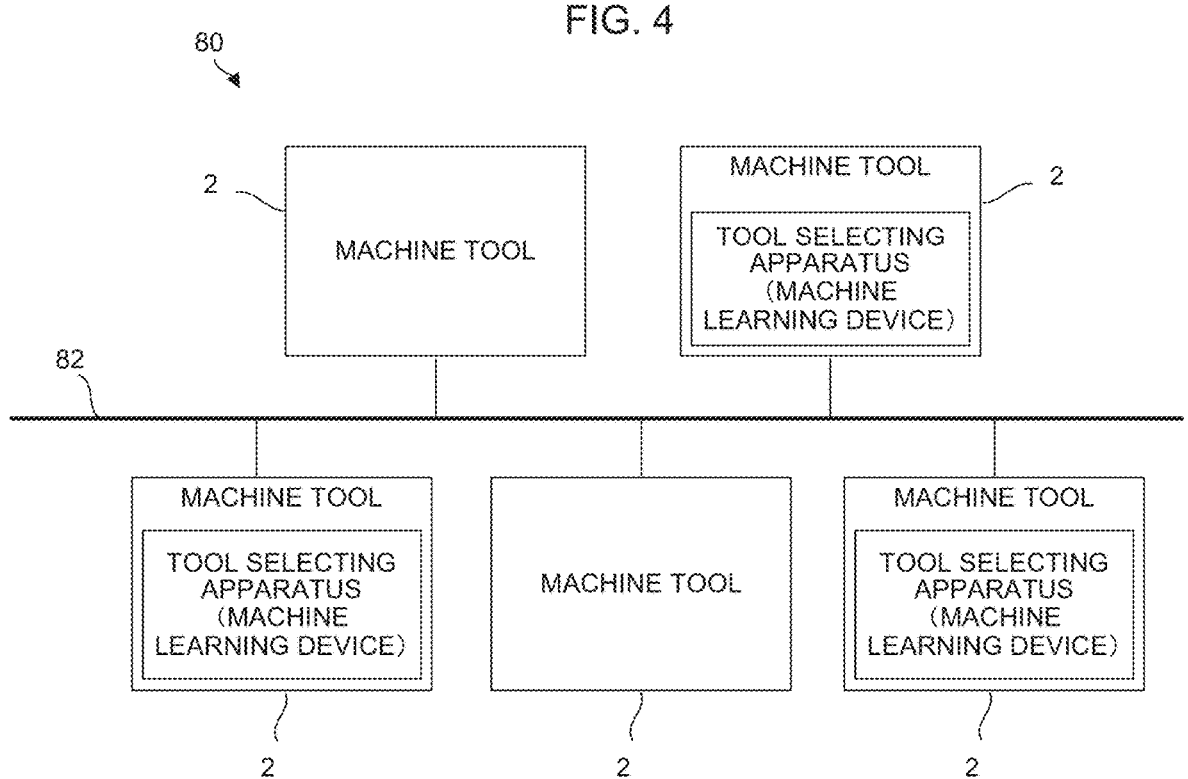
FIG. 4 is a schematic functional block diagram illustrating one aspect of a system including tool selecting apparatuses.

FIG. 4 illustrates a system 80 including the machine tools 2 according to one embodiment.

The system 80 includes a plurality of the machine tools 2 having the same machine configuration, and a network 82 via which the machine tools 2 are connected to each other. At least one of the machine tools 2 is configured as the machine tool 2 having the aforementioned tool selecting apparatus 1. The machine tools 2 each have a common configuration of a machine tool required for machining of workpieces.

In the system 80 having the aforementioned configuration, the machine tool 2 including the tool selecting apparatus 1, among the plurality of the machine tools 2, can automatically and precisely obtain, for each of machining-related conditions designated for the machine tools 2 (including the machine tool 2 that does not include the tool selecting apparatus 1), a tool type that is usable under the condition designated for the machine tool 2, by using the learning result by the learning unit 110. In addition, the tool selecting apparatus 1 of the at least one machine tool 2 can be configured to perform the same learning for all the machine tools 2, on the basis of the state variables S obtained for each of the other machine tools 2, and allow the learning result to be shared by all the machine tools 2. Therefore, with the system 80, the learning speeds or reliabilities of various data that are detected from the machine tools 2, upon reception of input of a larger variety of data sets (including the state variables S), can be improved.

Figure 5:
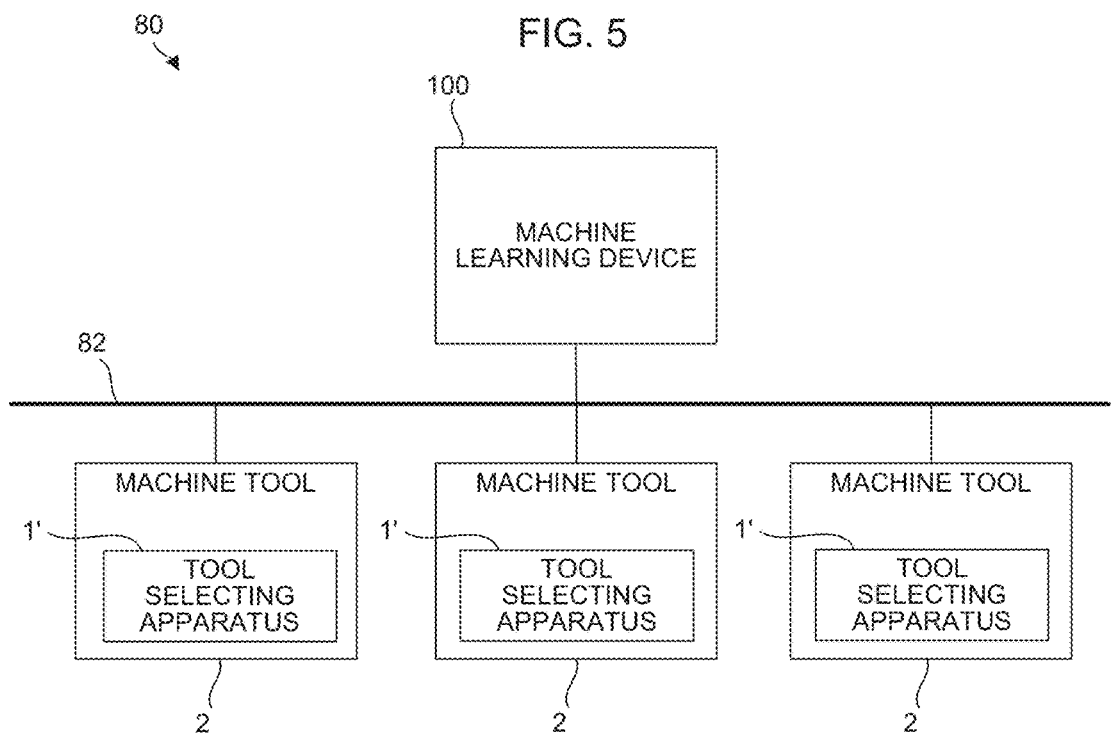
FIG. 5 is a schematic functional block diagram illustrating another aspect of the system including tool selecting apparatuses.

FIG. 5 illustrates the system 80 according to another aspect provided with the machine tools 2.

The system 80 is formed of a plurality of the machine tools 2 having the same machine configuration, and the machine learning device 100 that is connected to the machine tools 2 over a network 82 and that is disposed in a computer such as a cell computer, a host computer, or a cloud server. Each of the machine tools 2 includes a tool selecting apparatus 1' which is implemented as a controller for the machine tool 2. Note that, in the aspect illustrated in FIG. 5, the tool selecting apparatus 1' includes the nonvolatile memory 14, the control unit 34, and the tool selecting unit 36 which have been described with reference to FIG. 2.

In the system 80 having the aforementioned configuration, the machine learning device 100 performs the same learning for all the machine tools 2, based on the state variables S (and label data L) respectively obtained for the machine tools 2. With use of the learning result by the machine learning device 100, selection of a tool that is usable under a condition designated by each of the machine tools 2 and proposal of a cutting condition therefor are transmitted to the tool selecting apparatus 1' included in the machine tool 2. Then, in the tool selecting apparatus 1', an appropriate tool to be used by the machine tool 2 can be selected and a cutting condition therefor can be determined, based on the selection of a tool and a proposal of the cutting condition received from the machine learning device 100.

With this configuration, if needed, the required number of the machine tools 2 can be connected to the machine learning device 100, irrespective of the respective positions of the machine tools 2 or irrespective of a timing.

The embodiments of the present invention have been described above. However, the present invention is not limited to the aforementioned embodiments, and various embodiments can be implemented with appropriate modifications made thereto.

For example, the learning algorithm which is executed by the machine learning device 100, the computation algorithm which is executed by the machine learning device 100, and the control algorithm which is executed by the tool selecting apparatus 1 are not limited to those described above, and various algorithms can be used therefor.

The invention claimed is:

1. A tool selecting apparatus comprising:
a processor configured to
observe, when machining of a workpiece is currently performed, data related to machining condition, data related to cutting condition, data related to machining result, and data related to a tool, as state variables indicative of a current environmental state of the machining of the workpiece,
learn, by using the state variables, distribution of the data related to the machining condition, the data related to the cutting condition, and the data related to the machining result, with respect to the data related to the tool, the distribution being configured in a multi-dimensional space having axes indicating the data related to the machining condition, the data related to the cutting condition, the data related to the machining result, respectively, and
create different clusters for respective tool types each indicating a tool type-based trend of the learned distribution based on the learned distribution,
wherein the processor is further configured to
determine priorities for the respective tool types based on cluster densities of the different clusters,
select, for a designated condition, a tool type that is usable in the machining of the workpiece based on the tool type-based trend of learned distribution, and
control a machine tool and an actuator to use the selected tool type in the machining of the workpiece under the designated condition.

2. A tool selecting apparatus comprising:
a processor configured to
observe, when machining of a workpiece is currently performed, data related to machining condition, data related to cutting condition, data related to machining result, as state variables indicative of a current environmental state of the machining of the workpiece,
wherein the processor has learned distribution of the data related to the machining condition, the data related to the cutting condition, and the data related to the machining result, with respect to data related to a tool used in machining, the distribution being configured in a multi-dimensional space having axes indicating the data related to the machining condition, the data related to the cutting condition, the data related to the machining result, respectively,
the processor has created different clusters for respective tool types each indicating a tool type-based trend of the learned distribution based on the learned distribution,
the processor is further configured to
determine priorities for the respective tool types based on cluster densities of the different clusters,
determine a tool type that is usable under a condition designated by the state variables, based on the state variables and the tool type-based trend of the learned distribution,
output the determined tool type, and
control a machine tool and an actuator to use the determined tool type under the condition designated by the state variables.

3. The tool selecting apparatus according to claim 2, wherein
the processor is configured to determine the cutting condition designated along with the tool type determined to be usable, and output the cutting condition.

\* \* \* \* \*